Sept. 2, 1958 A. SNIJDERS 2,850,567

REGENERATIVE REPEATER SYSTEM

Filed March 20, 1953 6 Sheets-Sheet 1

INVENTOR:
ANTONIE SNIJDERS.
BY
Hugh A. Kirk
ATTY.

Sept. 2, 1958 A. SNIJDERS 2,850,567

REGENERATIVE REPEATER SYSTEM

Filed March 20, 1953 6 Sheets-Sheet 2

INVENTOR:
ANTONIE SNIJDERS.
BY
Hugh A Kirk
ATTY.

INVENTOR:
ANTONIE SNIJDERS.
BY Hugh A Kirk
ATTY.

Sept. 2, 1958 A. SNIJDERS 2,850,567

REGENERATIVE REPEATER SYSTEM

Filed March 20, 1953 6 Sheets-Sheet 4

INVENTOR:
ANTONIE SNIJDERS.
BY Hugh A. Kirk
ATTY.

Sept. 2, 1958 A. SNIJDERS 2,850,567

REGENERATIVE REPEATER SYSTEM

Filed March 20, 1953 6 Sheets-Sheet 5

INVENTOR:
ANTONIE SNIJDERS.
BY Hugh A Kirk
ATTY.

Sept. 2, 1958 A. SNIJDERS 2,850,567

REGENERATIVE REPEATER SYSTEM

Filed March 20, 1953 6 Sheets-Sheet 6

INVENTOR:
ANTONIE SNIJDERS.
BY Hugh A Kirk
ATTY.

United States Patent Office 2,850,567

Patented Sept. 2, 1958

2,850,567

REGENERATIVE REPEATER SYSTEM

Antonie Snijders, The Hague, Netherlands, assignor to Staatsbedrijf der Posterijen, Telegraphie en Telefonie, The Hague, Netherlands

Application March 20, 1953, Serial No. 343,632

Claims priority, application Netherlands March 24, 1952

32 Claims. (Cl. 178—53.1)

This invention relates to a completely or fully electronic regenerative repeater system. More particularly, it deals with such an electronic system adapted for the regenerative repetition of start-stop multi-element telegraph code signals, such as for example a five-unit or element time-spaced binary code in which each code signal may also include at least one synchronizing element, such as a stop and/or start element.

This invention is an improvement of the regenerative repeater system of Oberman and Snijders U. S. Patent No. 2,599,345, now Re. 23,801, as well as a modification of the system of Snijders prior co-pending applications Serial No. 322,180, filed November 24, 1952, and Serial No. 343,015, filed March 20, 1953, which applications are fully electronic communication systems and employ substantially the same types of basic standard circuits as are employed in the system of this invention.

It is an object of this invention to produce a simple, efficient, effective and economic fully electronic regenerative repeater system for receiving distorted and retransmitting undistorted multi-element code signals, such as start-stop telegraph code signals.

Another object is to produce such a system which contains fewer circuit elements and apparatus and is simpler to construct than either of said prior co-pending Snijders applications Serial No. 322,180 and Serial No. 343,015.

Another object is to produce such a system without a distributor or counting circuit of the type employed in said co-pending Snijders applications, or without relays as employed in said Reissure Patent No. Re. 23,801.

Another object is to produce such a system which may be adapted to automatic telegraph networks, wherein five, six, seven or even more elements per signal are automatically regenerated and repeated as soon as each of the elements is scanned.

Another object is to produce such a system having a circuit which ignores false starts or pulses by measuring the length of received pulses to insure that only start pulses of a predetermined duration will instigate the system and to reset itself immediately after any false start pulse has been received.

Another object is to produce such a system having a circuit which may be adjusted as to the time-length of one or more of its synchronizing elements, so as to automatically compensate for transmitters which transmit signals at too fast or too slow a rate.

Another object is to produce such a repeater system in which electronic relay cells are employed, such as those described in the Snijders co-pending application Serial No. 300,817, filed July 25, 1952. These electronic relays involve a plurality of rectifiers connected to a junction, all conducting in the same direction with respect to said junction, which junction may also be connected to a potential source through a low impedance, whereby the flow of current through a given one or more rectifiers from said junction may be controlled by the application of different potentials to other rectifiers connected to said junction.

The code signals employed in the repeater system of this invention are preferably composed of equally spaced elements, in which each signal contains the same number of elements, and each element may correspond to either a mark or a space, which may be indicated by either a positive or a negative potential, or vice versa. The first and/or last element of each signal may be a synchronizing element, and may be identified as start and stop elements, respectively, which elements always have the same and opposite polarities. The intermediate elements, of which there may be five as in a teleprinter telegraph code signal, may correspondingly be either plus or minus (positive or negative) and may be used to convey the intelligence to be communicated by the signal. The system of this invention is so timed and synchronized that it detects or scans the pulses corresponding to each of these elements at substantially their centers thereby avoiding errors due to distortion of the leading or trailing edges of the pulse elements.

Generally speaking, the regenerative repeater system of this invention comprises an arrangement of four different standard types of electronic circuits, namely, a bi-stable trigger circuit having two possible states of equilibrium, a multivibrator impulse generator, a start-stop circuit for controlling said generator, and an electron relay cell. The arrangement of these basic type circuits comprises: an input shaper trigger type circuit, an output memory type trigger circuit, a scanning circuit comprising a pair of electron relay cells connected between said input and output circuits, a start-stop circuit connected to a multivibrator impulse generator, another scanning circuit comprising another pair of electron relay cells controlled by the impulses from the generator, an auxiliary start-stop trigger type circuit which is partly stable to control the stopping of the start-stop circuit, and an impulse amplifier trigger type circuit controlled by the impulses from the generator to control the auxiliary start-stop circuit. In addition to above circuits there are also the necessary conductor connections between them, some of which include other electron relay cells, and in particular a locking circuit for preventing the output circuit from taking an erroneous state during the rest condition for the system.

In the above mentioned arrangement of circuits for the system of this invention, a signal having an initial start element of a given polarity followed by a plurality of intelligence elements of either of two different polarities is received at the input circuit, regenerated and retransmitted or repeated from the output memory type trigger circuit. However, before any such signal may be regenerated in the system, its first or start element of each signal must have at least a predetermined duration to change the circuits of the system from their rest condition. Assuming such is the case, the proper start element changes the state of the input circuit from its rest condition and through a pair of electron relay cell means starts the start-stop circuit to start the impulse multivibrator generator to produce simultaneously impulses of opposie polarities which are employed for synchronizing and scanning functions in the two scanning circuits or devices to which generator both scanning devices are directly connected. The first pair of impulses from the generator changes the state of the impulse amplifier to produce a large impulse of one polarity to charge a condenser in a time constant or delay circuit connected to the input of the auxiliary start-stop circuit which changes and maintains changed the state of the auxiliary start-stop circuit throughout the remaining time for the regeneration of the intelligence elements of the signal under the control of one of the scanning devices, after which its state is automatically changed back again to rest condition by a predetermined smaller, later and opposite polarity impulse from the amplifier circuit. This causes the start-stop circuit to be shut-off through a pair of electron relay cells, which then immediately stops the generator from producing more impulses until the next start element of a succeeding signal is received. In the meantime, each of the impulses from the generator also operate the other scanning device to scan substantially the centres of each of the signal elements received at the input circuit and transfer them to the memory device or storing trigger type output circuit which changes its state corresponding to the polarity of the signal element received and maintains that changed state until changed therefrom by a succeeding received and scanned signal element of a different polarity. If desired, the input circuit may be replaced by a polarized relay circuit for applying two different polarity signal elements to the system, and also the output of the output memory circuit may be connected to operate another polarized relay.

The above mentioned and other features and objects of this invention and the manner of attaining them are given more specific disclosure in the following description of an embodiment of the invention taken in conjunction with the accompanying drawings, wherein.

Figure 1:
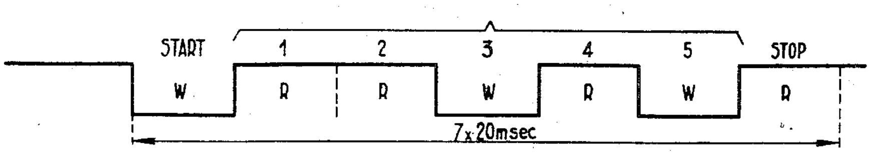
Fig. 1 is a wave diagram of a signal having five intelligence elements preceded by a start element of negative potential or polarity and followed by a stop element of positive potential or polarity.
Figure 7:
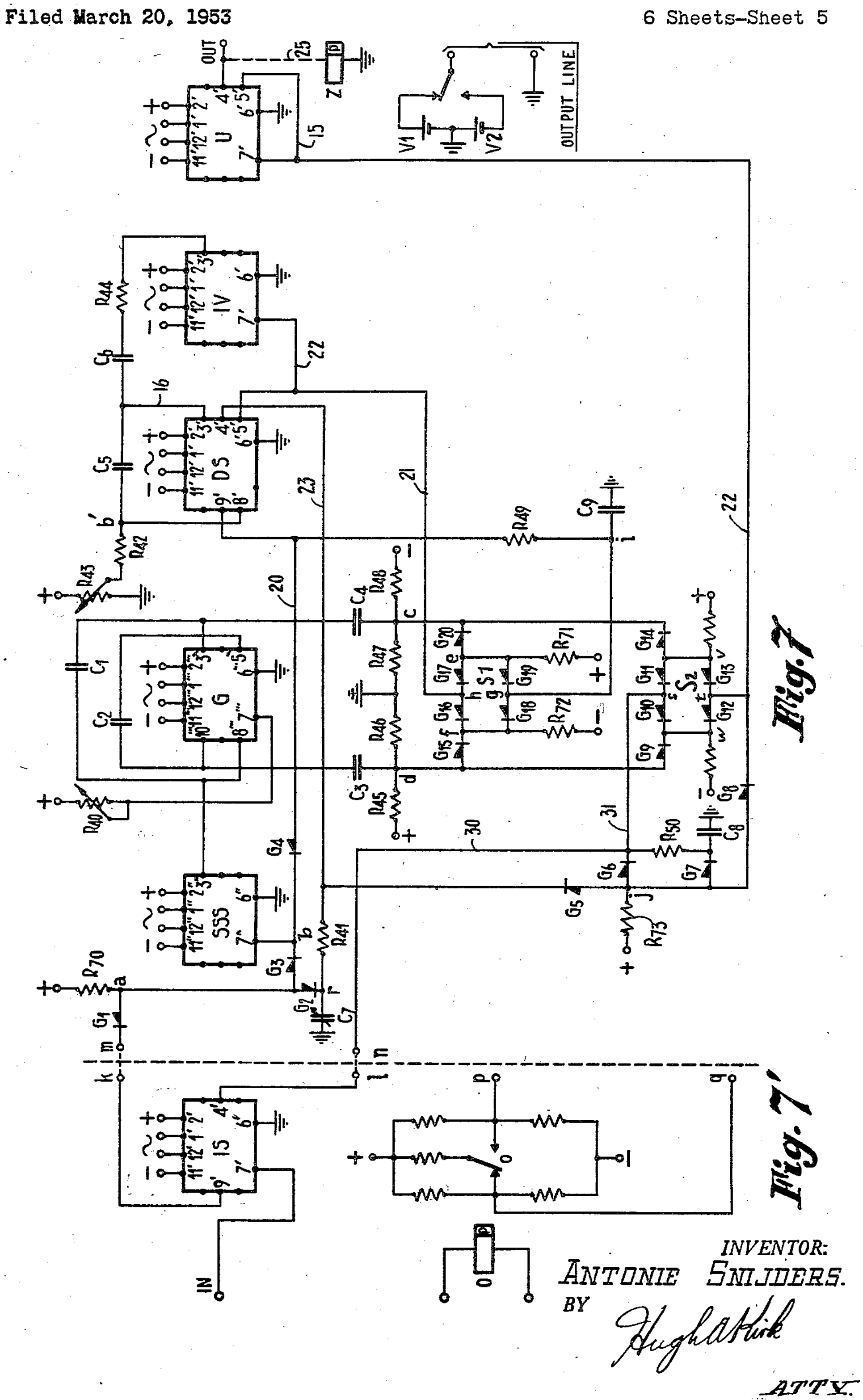
Fig. 7 is a schematic block and circuit diagram of a regenerative repeater system embodying the present invention and adapted for repeating a five-unit start-stop telegraph code signal of the type shown in Fig. 1.
Figure 8:
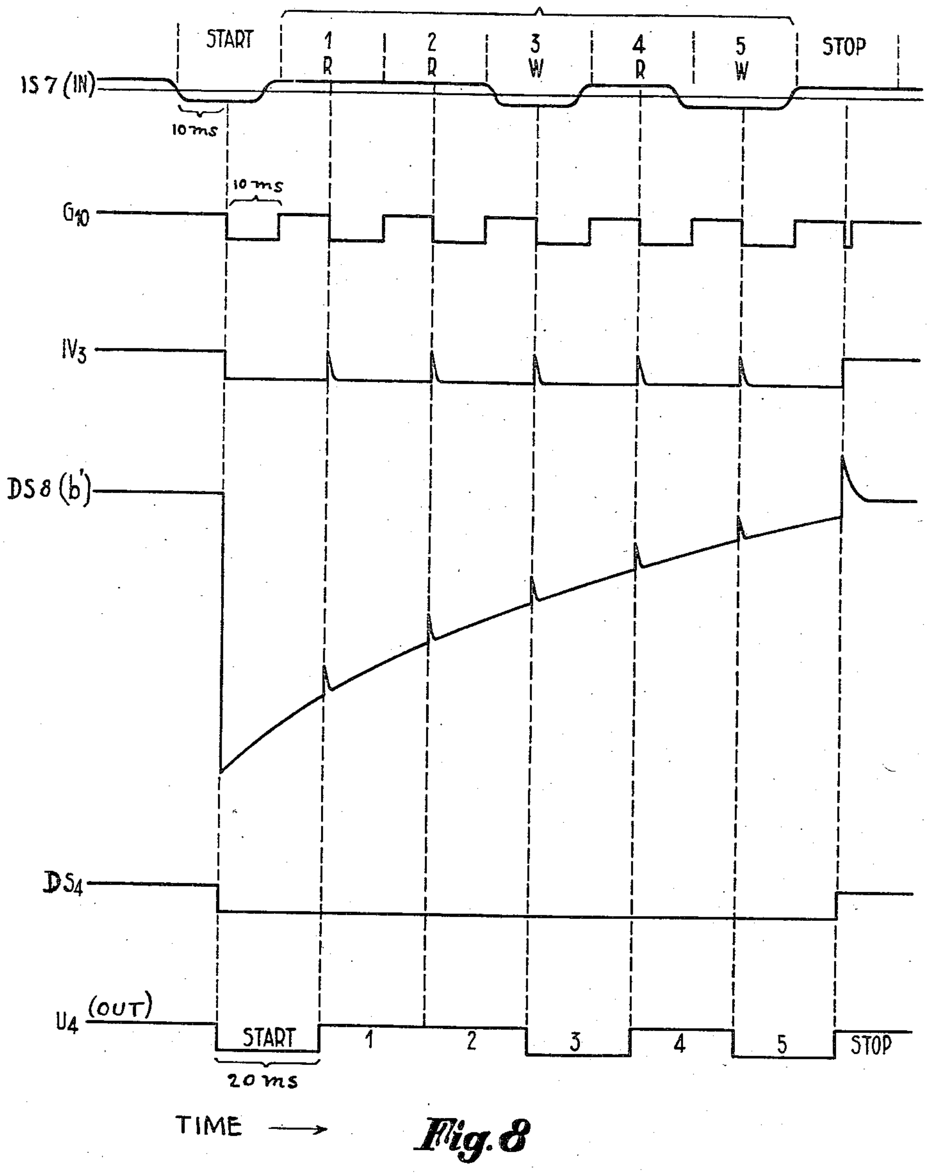

Fig. 7′ is a modified form of an input circuit which may replace the circuit IS shown in Fig. 7; and Fig. 8 represents graphs of the voltages with respect to time for a signal similar to that shown in Fig. 1 at various terminals of the repeater system of Fig. 7.

In order to illustrate this invention the following description by way of example is directed to systems for communicating telegraph code signals of marks and spaces, or of + and − polarity pulses, comprising seven equal time-spaced elements, which description will now be divided into chapters and sections according to the following outline:

I. The Multi-Element Signal (Fig. 1)
II. Component Circuits
  1. General arrangement
  2. Standard trigger circuits (Figs. 2 and 3)
  3. Start-stop and generator circuits (Figs. 4, 5, 6)
III. A Regenerative Repeater System (Figs. 7, 7′, 8)
  1. Rest condition and locking circuit
  2. Starting circuits
  3. Scanning and storing circuits
  4. Stopping circuit

I. MULTI-ELEMENT SIGNAL

Referring to Fig. 1 a wave form of one complete start-stop code signal is graphically disclosed to be composed of seven elements, each of 20 milliseconds duration, in which the first start or mark element is indicated as a negative pulse W and the seventh stop or space element is indicated as a positive pulse R, while the five intelligence elements 1, 2, 3, 4, and 5 may be either spaces R or marks W. The start and stop elements are of opposite polarity from each other, however, either may be of mark potential or polarity. The duration in time-length of the seventh, last or stop element may be varied to compensate for signals which are received at too fast or too slow a rate. There is a preferred minimum limit for the duration of one complete signal, namely about 130 milliseconds, which duration may be controlled or adjusted by condenser or capacitor C7 (see Fig. 7). This control happens by adjusting the duration of the seventh, last or stop element, which can be varied from 10 milliseconds upward. After said duration the repeater is ready to receive the start element of a new signal. If such a new start element is not yet present, the stop element will be lengthened until the moment of appearance of a new start element. If this limit of 130 milliseconds were reduced more it would reduce the regenerative capacity of the system. The start element pulse must have a duration of at least 10 milliseconds before the system of this invention will respond. This feature also enables each of the intelligence signal elements to be scanned about 10 milliseconds after their leading edges, or about in their centers which permits considerable more distortion of their pulse edges than could nomally be tolerated in some previously known systems. Thus, the circuits of this invention are timed so that the first intelligence element is scanned 30 milliseconds after the leading edge of the start element of its corresponding signal.

II. COMPONENT CIRCUITS

(1) *General arrangement*

The general arrangement of the circuit elements or components of this invention for a regenerative repeater system is similar to that shown in Fig. 7 and comprises:

(1) An incoming amplifier and/or shaper IS for the received pulses according to the wave form shown in Fig. 1, which sharpens the leading and trailing edges of each of the signal element pulses;

(2) A start-stop circuit SSS for starting and stopping the multivibrator or generator G;

(3) A multivibrator impulse generator G, preferably having a 50 cycle oscillation rate to correspond with the 20 milliseconds duration of each element in the signal of Fig. 1, which generator emits simultaneously and alternately positive and negative impulses each 10 milliseconds, only every other pair of impulses from which are employed after the first pair of impulses of each cycle operates the first auxiliary start-stop circuit DS;

(4) An auxiliary start-stop circuit DS which is partly unstable and partly stable which controls the stopping of the start-stop circuit SSS and in turn the generator G;

(5) An impulse amplifier IV which acts as an auxiliary circuit for the auxiliary start-stop circuit DS;

(6) An output memory device U which stores the received signal elements as they are scanned and retransmits them from its output;

(7) A pair of scanning devices S1 and S2 each comprising a pair of electronic relay cells of three rectifiers each for respectively controlling said amplifier circuit IV and said output circuit U; and (8) Other electron relay cells of at least two rectifiers each, interconnecting and controlling many of the above circuits.

Next a detailed description and operation of the three basic electron tube containing circuits will be described.

(2) *Standard trigger circuit*

The shaper, amplifier and input circuits IS, IV and the memory output circuit U, as well as the party stable auxiliary circuit DS are basically all standard trigger or flip-flop circuits each having two possible states of equilibrium similar to that described in Snijders co-pending U. S. patent application Serial No. 300,817, filed July 25, 1952, however, a detailed wiring diagram of this trigger circuit is shown again here in Fig. 2.

This standard trigger circuit comprises a pair of electron tubes, such as double triodes **B1*a* and B1*b* (which may be for example an E90CC tube), which are connected by means of a number of resistors, and may also contain a pair of neon indicator lamps L1 and L2 to indicate which one of the two tubes is conducting at any given time. These two tubes B1*a* and B1*b* have a common cathode resistor R15 which may be connected through a terminal 11′ to the negative pole of the battery V. The anode resistances of the tubes are connected respectively to parallel resistors R1/R2 and R4/R5 which then may be connected through a terminal 2′ to the positive pole of the battery V. Potentiometers R6/R11 and R9/R19 are connected from the anodes of the tubes B1*a* and B1*b*, respectively to the negative pole of the battery V, with the taps or center points of these potentiometers between their respective pairs of resistors being connected to the output terminals 9′ and 4′, respectively, of the trigger circuit. Between these two output terminals 9′ and 4′ is connected a pair of resistors R12 and R18 in series with each other, which resistors may be of equal value, and the connection between them may be connected to another terminal 6′ of the trigger circuit, which generally in the system of this invention is connected to a common ground maintained at a potential between the positive and the negative poles of the battery V. Also in this standard trigger circuit are two high ohmic potentiometers R8/R16 and R7/R14 connected from the respective anodes of the tubes B1*a* and B1*b* to the negative battery pole through the terminal 11′. These two potentiometers R8/R16 and R7/R14 are in parallel with the potentiometers R6/R11 and R9/R19 mentioned above. The tap to potentiometer R8/R16 is connected to the control grid of the tube B1*b* and also through a resistor R17 to the ground terminal 6′. The tap of the potentiometer R7/R14 is connected to the terminal 5′ and also through a resistor R13 to the same ground terminal 6′. The control grid of the tube B1*a* is directly connected to the input terminal 8′ and may also be connected via a resistance R10 to another input terminal 7′. The anode of the tube B1*a* is directly connected to a terminal 10′ and the anode of the tube B1*b* is directly connected to the terminal 3′. The gas filled or neon indicator tubes L1 and L2 are also connected to the anodes of the tubes B1*a* and B1*b*, respectively, and thence via a common resistance R3 through the terminal 2′ to the positive pole of the battery V. Terminals 1′ and 12′ of this trigger circuit supply the current for heating the cathodes of the tubes B1*a* and B1*b***.

If the control grid of the tube **B1*a* is strongly negative with respect to its cathode, it is non-conductive and carries no current; and via potentiometer R8/R16 a positive potential is applied to the control grid of tube B1*b* through resistors R8, R1/R2 from the positive terminal 2′. The tube B1*b* is then conductive which makes its anode voltage lower or less positive than the anode voltage of the tube B1*a*, so that the indicator lamp or tube L2 glows and indicator lamp or tube L1 is extinguished. The output terminal 9′ thus has a higher positive voltage than the output terminal 4′ and terminal 6′ thus has a voltage which is intermediate the voltages of the output terminals 9′ and 4′ because the resistors R12 and R18 are preferably selected to have equal ohmic values. When the potential to the control grid of the tube B1*a* rises or becomes more positive to a predetermined voltage, this tube B1*a* will become conductive placing a more negative voltage on the grid of the tube B1*b* through resistor R8, and as a result of which the tube B1*b* will then become non-conductive. The indicator lamp L1 then begins to glow and lamp L2 is then extinguished. The output terminals 9′ and 4′ then also interchange their voltages. The circuit is so connected that the transition from one condition to the other takes place substantially instantaneously or with a jump, or triggers, which action occurs within a small voltage range of say about 1 volt or ± half a volt of the predetermined control voltage at the input terminal 7′ or 8′. In either condition of the circuit, however, the terminal 6′ has substantially the same voltage because the resistors R12 and R18 are equal. Thus, if the input terminal 7′ bears a voltage that is nearly equal to the voltage of the terminal 6′, i. e. slightly below or slightly above (i. e. more negative or more positive than) that on terminal 6′**, the condition of the circuit changes.

This operation may be more clearly illustrated by a specific example, the results of which are shown on the graphs in Fig. 3 except for auxiliary circuit DS which is described later with the graphs in Fig. 8. In this example the values of the resistances or resistors have been considered to be as follows:

$$R1=R2=R4=R5=R6=R9=R11=R12=R18=R19=39 \text{ kilo ohms } (k\Omega)$$

$R7=R8=R13=R14=R16=1$ megohm (MΩ); $R3=820$ kΩ, $R10=470$ kΩ, $R15=50$ kΩ, and $R17=270$ kΩ. The battery V has been chosen to have a voltage of 220 volts between its positive and negative poles.

Figure 3:
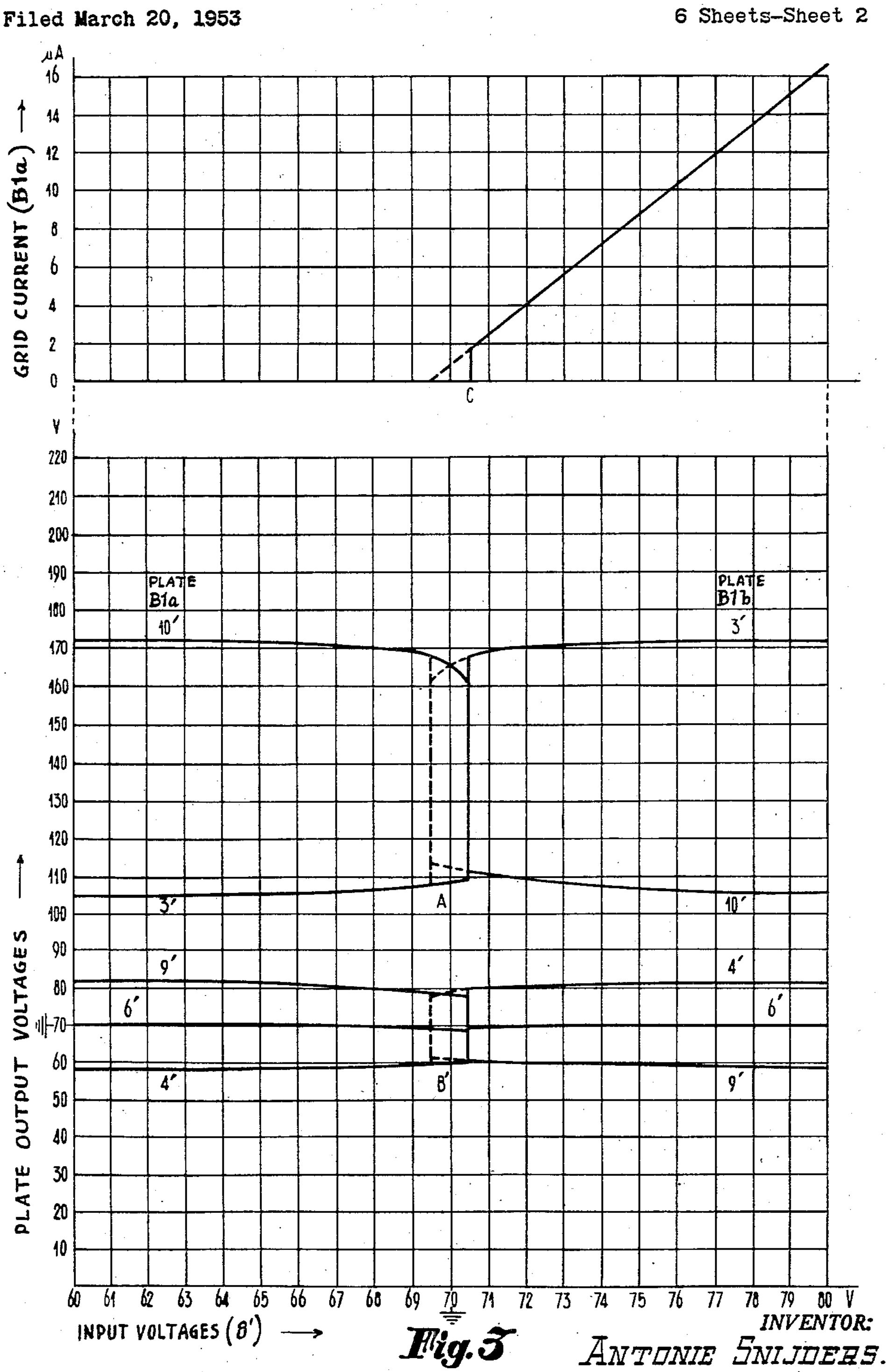
Fig. 3 represents graphs of the grid current and plate output voltages for various input voltages at different terminals of the standard trigger circuit shown in Fig. 2 when being employed as a bi-stable circuit.

With tube **B1*a* non-conductive the output terminals 9′ and 4′ bear voltages of 80 volts and 60 volts, respectively, and the input voltage at terminal 7′ or 8′ will be lower than 70 volts; while terminal 6′ has a voltage of 70 volts (see Fig. 3). If the input voltage (the abscissa) of the graph shown at B in Fig. 3 is increased above 70 volts to about 70.5 volts, the output voltage (the ordinate) at terminal 4′ changes from 60 volts to 80 volts and terminal 9′ changes from 80 volts to 60 volts. In the case of a further increase of the input voltage at terminal 7′ or 8′, the voltage occurring at the output terminals 4′ and 9′ remain practically unchanged as can be seen by the substantially horizontal lines 4′ and 9′** of the curves in Fig. 3. If the input voltage is decreased, the voltage will revert to the original condition when the input voltage reduces to about 69.5 volts (see the dotted lines at B in Fig. 3).

If the output terminals 9′ and 4′ are loaded, the voltage occurring at these terminals would change, which also would change the voltage occurring at terminal 6′ because it is connected to have a voltage halfway between that at terminals 9′ and 4′, and since there is a coupling between the control grid of the tube **B1*b* through a resistance R17 and the terminal 6′, there would also be a change in the input voltage to tube B1*b* which could cause the circuit to change its condition. However, since several of these circuits must cooperate in one system according to this invention, the terminals 6′ are connected together so that the voltage levels at their terminals 6′** remain constant and as equal as possible.

The output of the tubes **B1*a* and B1*b* indicated by curves 10′ and 3′, respectively, are disclosed in Fig. 3 to have a wider voltage range than those taken from the terminals 9′ and 4′ because of the resistances of the potentiometers R6/R11 and R9/R19, respectively, through which terminals 9′ and 4′ are connected. There is also shown for comparison purposes at the top of Fig. 3 a graph of the grid current for the tube B1*a* with respect to the input voltages at terminal 8′ to show when the tube B1*a* is conductive with respect to the voltages at output terminals 3′, 4′, 9′ and 10′**.

The output terminal 5′ (see Fig. 2), which is of high ohmic value or nature, may be connected to the input terminal 7′ so that the condition of the trigger circuit remains unchanged after the controlling input voltage has been taken away from the terminal 7′ or 8′. Such a circuit connection is shown by dotted line conductor 15 and is employed in converting the standard circuit of Fig. 2 to the memory device circuit U shown in Fig. 7.

The other dotted line connection through a conductor 16 and a condenser C5 between the output terminal 3′ and the input terminal 8′ relates to the employment of the basic circuit of Fig. 2 as the partly stable auxiliary start-stop circuit DS in Fig. 7 to which the graphs shown in Fig. 8 apply instead of those shown in Fig. 3, as will be described later in section III–2.

(3) *Start-stop and generator circuits*

Figures 4, 5:
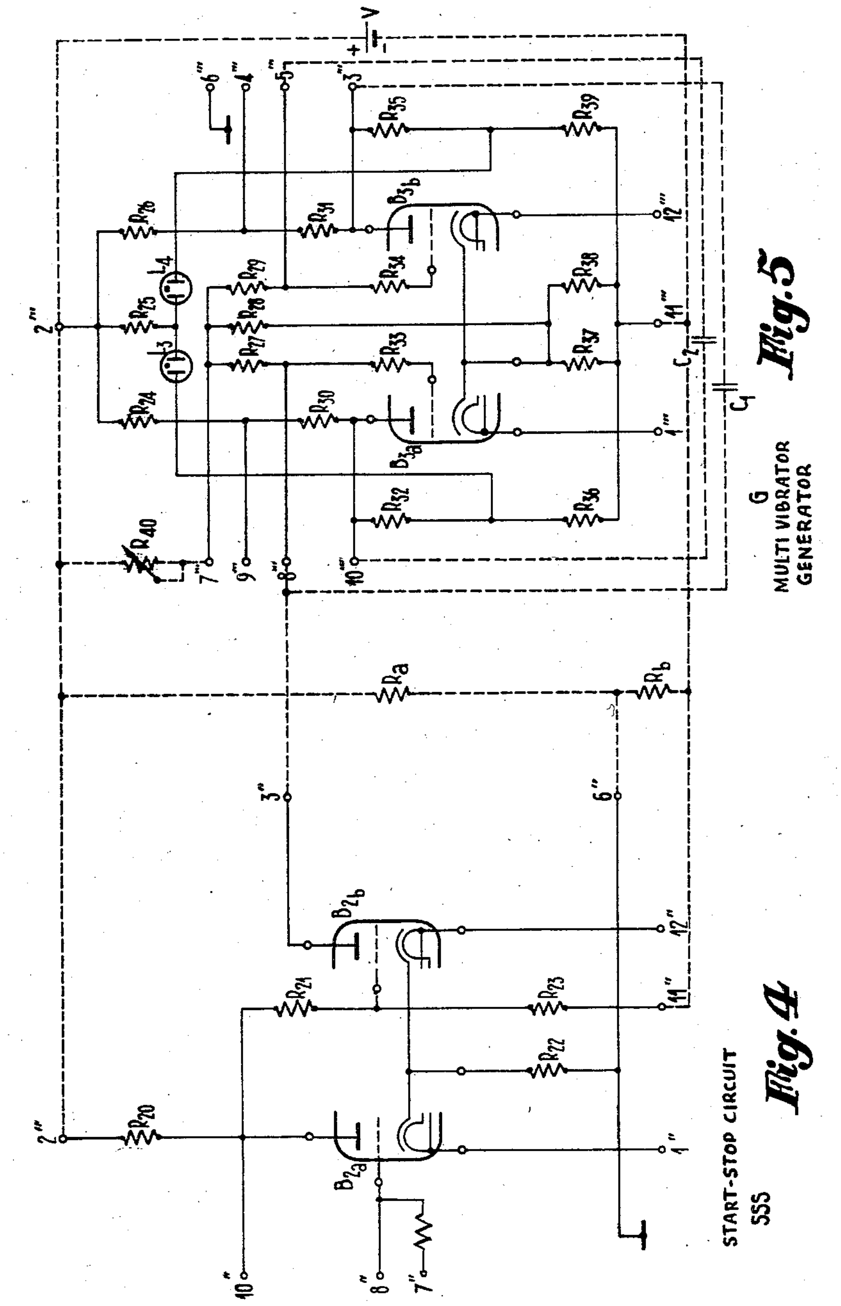
Fig. 4 is a wiring diagram of the start-stop circuit SSS shown in Fig. 7 together with some of its connections (shown in dotted lines) to the multivibrator generator G of Fig. 5.
Fig. 5 is a wiring diagram of the multivibrator generator circuit G shown in Fig. 7 together with some of its connections (shown in dotted lines) to the start-stop circuit SSS of Fig. 4.

Detailed circuits of the start-stop circuit SSS and multivibrator or generator G are shown, respectively, in Figs. 4 and 5, with connection to some of their terminals shown in dotted lines in accordance with their normal connection in the circuit of Fig. 7.

The start-stop circuit shown in Fig. 4 is used for starting and stopping the multivibrator circuit shown in Fig. 5 in response to the start and stop elements of the code signal; the start element pulse being transmitted from an input circuit IS through an electron relay cell means to the input terminal 7″ of the start-stop circuit SSS, and the stop element pulse being transmitted from the auxiliary start-stop circuit DS through an electron relay cell means.

For the purposes of illustration specific examples are presented of a start-stop circuit SSS and a generator G, each of which circuits may comprise a double triode tube B2*a*/B2*b* and B3*a*/B3*b*, respectively, and may be composed of resistances or resistors having the following ohmic values: In Fig. 4 resistors R20=R23=1.2MΩ, R21=820 kΩ, R22=27 kΩ; and in Fig. 5 resistors R24=R26=R30=R31=10 kΩ, and R25=680 kΩ, R27=R29=1 MΩ, R28=R37=56 kΩ, R32=R35=270 kΩ, R33=R34=39 kΩ, R36=R39=560 kΩ, R38=47 kΩ. There is also shown connected by dotted lines to the multivibrator or generator circuit G of Fig. 5, two condensers C1 and C2 each of about $20,000\times10^{-12}$ farads or 0.02 μF (microfarads).

The voltage at the cathode of the double triode B2*a*/B2*b* of the start-stop circuit SSS is about 70 volts and the battery V has a voltage of 220 volts. If the control grid of the tube B2*a* has a voltage which is lower than 70 volts, this tube is non-conductive and carries no current. As a result of this condition the tube B2*b* is conductive and does carry current. The anode of tube B2*b* is directly connected to output terminal 3″.

Referring now to the generator G in Fig. 5 the output terminal 3″ is directly connected to the generator input terminal 8‴, which is then connected both through a resistance R27 to a positive terminal 7‴ and through a resistance R33 to the control grid of the tube B3*a* of the generator. Thus, the grid of the tube B3*a* has the same negative potential with respect to its cathode as this grid, if during the working of the multivibrator the tube B3*a* is non-conductive. The control grid of the tube B3*b* in the generator is connected via resistors R34 and R29 also to the positive potential at the terminal 7‴. Connected at the terminal 7‴, between it and positive battery V, may be a variable resistor R40 by means of which the frequency of the whole multivibrator circuit of Fig. 5 may be adjusted, which in the case for scanning the signal of Fig. 1 is 50 cycles/second. With the grid of tube B3*b* connected to a positive terminal 7‴, this tube is conductive and the indicator lamp L4 associated therewith glows.

The capacitors C1 and C2 connected, respectively, between the anode of tube B3*b* or terminal 3‴ and the grid of tube B3*a* through terminal 8‴, and the anode of tube B3*a* or terminal 10‴ and the grid of the tube B3*b* through terminal 5‴, are charged to equal voltages by the conductivity of this tube B3*b*. If the voltage in the control grid of the tube B2*a* of the start-stop circuit SSS is increased or becomes more positive to about 70 volts, this tube B2*a* will become conductive and the tube B2*b* will be cut-off or become non-conductive. The capacitor C1 then discharges itself via the resistor R27 and the control grid voltage of tube B3*a* arises. After 10 milliseconds, the tube B3*a* of the generator circuit G becomes conductive and its corresponding indicator lamp L3 glows, this being the time for the discharge of the condenser C1. Then the voltage drop occurring at the anode of the tube B3*a* is transferred by means of the capacitor C2 to the control grid of the tube B3*b* through resistor R34, as a result of which this tube B3*b* now becomes non-conductive. The capacitor C1 is now quickly recharged to the original high value via the anode resistances R26 and R31. In consequence of the discharge of capacitor C2 via the resistor R29, the control grid of tube B3*b* will attain the potential of its cathode again, so that this tube again becomes conductive and the tube B3*a* again becomes non-conductive, etc. Thus, via the time constant circuits C2/R29 and C1/R27 the tubes B3*a* and B3*b* alternately become conductive every 10 milliseconds to produce alternate pulses at their output terminals 3‴ and 10‴ forming two square waves (see one such wave G10 in Fig. 8).

The continued generation of this output wave is stopped, however, by putting the tube B2*a* in the start-stop circuit SSS of Fig. 4 in its non-conductive state again, by reducing the control grid voltage of this tube below 70 volts at its input terminal 8″ or 7″. This is done by a negative pulse potential, corresponding to the stop element of a signal, applied from the auxiliary start-stop circuit DS to cause the grid of tube B2*a* to become more negative and to shut-off the conductivity of tube B2*a* which in turn causes the tube B2*b* to become conductive again and to shut-off the multivibrator generator G in Fig. 5 at the end of its cycle of oscillation corresponding to the end of a complete code signal.

It is to be observed that if the tube B2*a* in the start-stop circuit becomes conductive for a shorter time than 10 milliseconds, the generator tubes B3*a*/B3*b* will not change their conductivity conditions and the generator G will not start oscillating. If desired, this interval may be shortened or lengthened in two ways: (1) by choosing the various elements, such as resistors of the start-stop circuit SSS such that if the tube B2*b* is conductive, the control grid of the tube B3*a* will have a higher or lower potential than the voltage this grid had if tube B3*a* is non-conductive during the working of the multivibrator; or (2) by choosing the values of the condensers C1 and C2 to be unequal (but so that the multivibrator continues to work on a frequency of 50 cycles).

Figure 6:
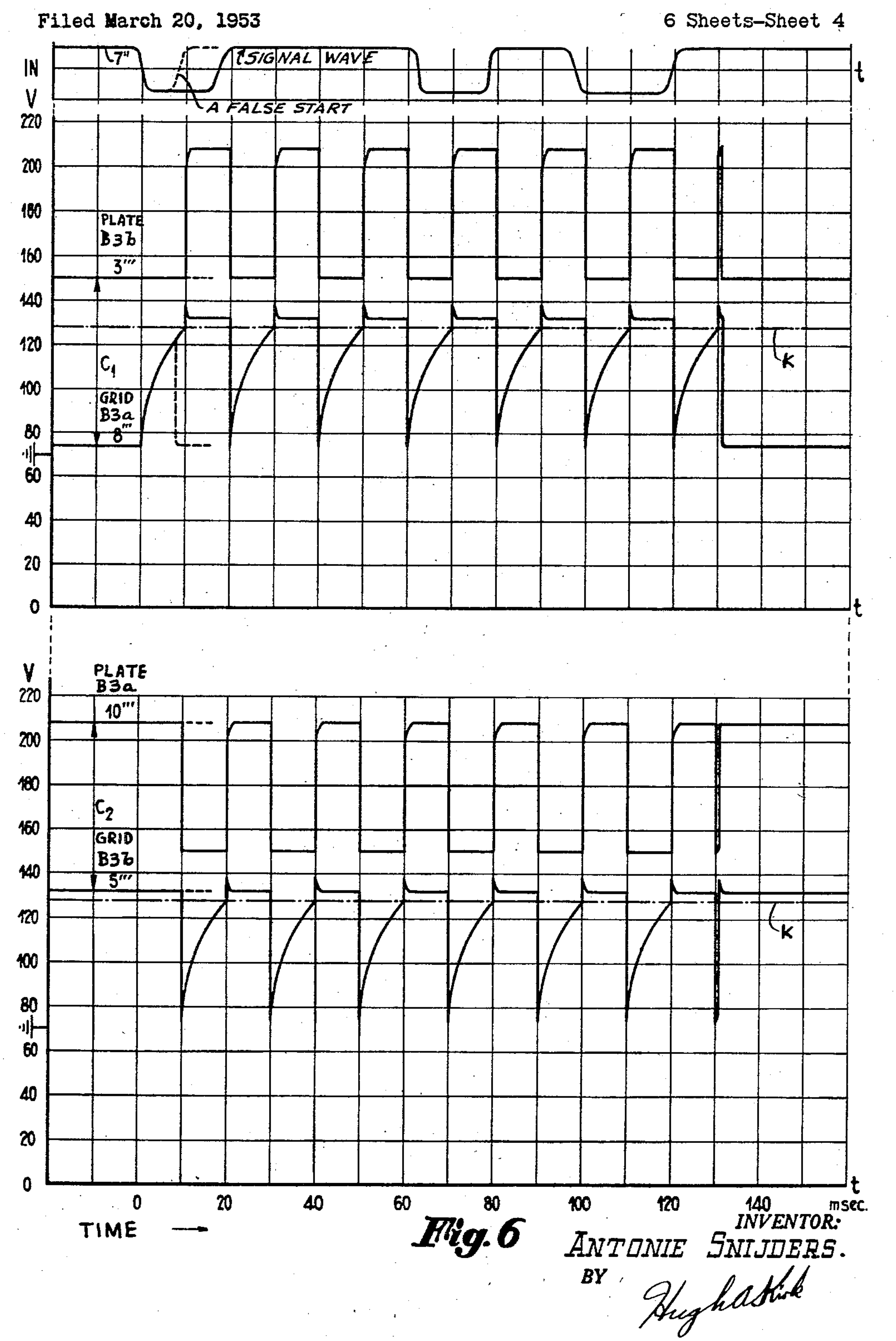
Fig. 6 represents graphs of the voltages with respect to the time for one multi-element signal at various terminals of the multivibrator circuit of Fig. 5.

In Fig. 6 are shown graphs of the potentials at the points of the terminals 3‴, 8‴, 10‴, and 5‴ of the multivibrator circuit of Fig. 5, with respect to the time corresponding to an input code signal wave 7″ of seven elements shown at the top of the graph. It should be noted that the difference between the potentials at the output terminals 3‴ and 8‴ corresponds to the varying charges on condenser C1, and the difference between potentials at the output terminals 10‴ and 5‴ corresponds to the varying charges on condenser C2. The cathode potentials of the two tubes B3*a* and B3*b* of the multivibrator circuit of Fig. 5 are indicated by the dot-dash line K at about 125 volts in each of these graphs. Thus, when the input voltage on terminal 8‴ or 5‴ exceeds the cathode voltage K, the tubes trip over so that the tube B3*a* or B3*b*, respectively, is made conductive and the other tube shuts off.

It should be noted that a false start pulse or a pulse less than 10 milliseconds in duration, an example of which is shown in the dotted lines at the beginning of the signal 7″ at the top of the graph in Fig. 6, is not of sufficient duration to completely discharge the condenser C1 or C2 to reach the cathode potential K, and accordingly any number of such false pulses less than 10 milliseconds in duration will not start the multivibrator circuit G into operation. Thus the multivibrator circuit of Fig. 5 automatically ignores such false start pulses regardless of how often they are repeated.

III. A REGENERATIVE REPEATER SYSTEM

Now that the details of the basic circuits employed in this invention have been described, the specific connections and details of a regenerative repeater will be described, including the electron relay cell means, which are an important and essential feature of the system of this invention. A wiring diagram for such a repeater is shown in Fig. 7 in which the previously described circuits IS, SSS, G, DS, IV and U are represented by boxes with their terminals having corresponding numbers to those described in Figs. 2, 4 and 5. First it should be noted that all of the terminals 6′, 6″ and 6‴ of all these box circuits are connected to ground. As a result of this, the input level of each circuit is adjusted to ground potential, and the output voltages at the terminals 9′ and 4′ have values of plus 10 volts or minus 10 volts with respect to ground. This is in accordance with the specific examples mentioned above, wherein a battery of 220 volts is employed with its corresponding poles connected to all of the positive poles 2 having a +150 volts with respect to ground and the negative poles 11 of these circuits having a −70 volts with respect to ground.

Figure 2:
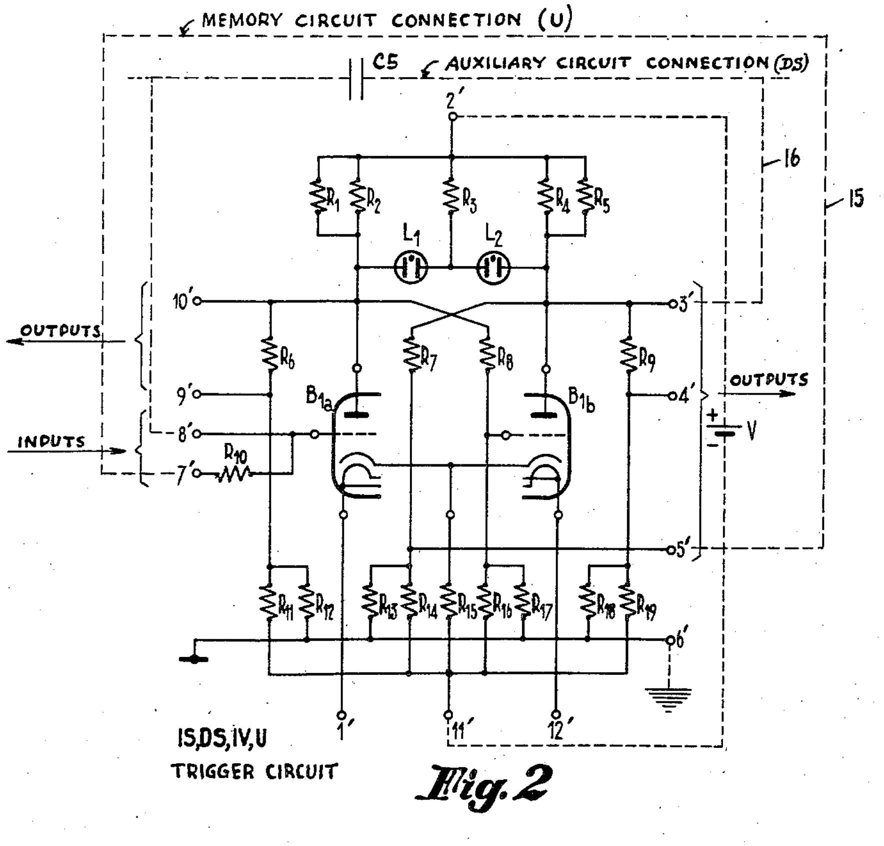
Fig. 2 is a wiring diagram of the standard trigger or special flip-flop circuit with some of the different employed connections being shown in dotted lines, which trigger circuit is employed several times in the system of Fig. 7 at IS, DS, IV and U.

The circuits IS, IV, DS and U are standard trigger circuits according to those described in Fig. 2; the start-stop circuit SSS is according to Fig. 4; and the multivibrator generator circuit G is according to Fig. 5.

1. *Rest condition and locking circuit*

Before describing the operation of the regenerative repeater system of Fig. 7, its rest condition will be described which is its energized or turned-on condition before the start element of any signal to be repeated has been received or applied to the input terminal IN connected directly to the input terminal 7′ of the input shaper circuit IS.

In this rest condition, the trigger type circuits IS, DS, IV and U as shown in Fig. 2 described above, are all in their positive states, corresponding to various positive potential source connections being applied to their input terminals 7′ whereby their electron tubes B1*a* are conductive and their electron tubes B1*b* are non-conductive, so that a potential negative with respect to ground is applied to their output terminals 9′ and potentials positive with respect to ground are applied to their output terminals 3′, 4′ and 5′. These above conditions of rest for the trigger type circuits insures that the start-stop circuit SSS and its dependent multivibrator generator circuit G are correspondingly in their negative states and inoperate, since the negative potential from the output terminal 9′ of the input circuit IS maintains the junction *a* of the first electron relay cell means at a negative potential through rectifier G1, which junction *a* then applies a negative potential to the rectifier G3 connected to junction *b* of another electron relay cell means connected to the input terminal 7″ of the start-stop circuit SSS, and since the negative potential from the output terminal 9′ of the auxiliary circuit DS through conductor 20 applies a negative potential to the only other rectifier G4 of the electron relay cell means having the junction *b*. Thus no positive potential is applied to the input terminal 7″ of the start-stop circuit SSS and it is maintained in its negative state, thereby maintaining its control of the generator circuit G to keep it inoperative also. The other rectifier G2 connected to the junction *a* of the first relay cell means may have either a positive or a negative potential applied to it, without affecting the negative potential of the junction *a*, because this junction *a* takes the most negative potential applied to it, and the reverse conductance of the rectifiers G3 and G4 connected to the junction *b* of the other electron relay cell means insures that it will take the most positive potential applied to it.

Regarding the potentials in rest condition at the junctions or different points relative to the scanning device S1 from the energization of the circuits mentioned above, the point *i* connected to the now negative output terminal 9′ of the auxiliary circuit DS through resistance R49 will also be negative in potential, as will the input terminal *g* of the scanning device S1 which is connected directly to the point *i*. This terminal *g* is at a common input to both of the electron relay cell means having separate junctions *e* and *f*, and is connected to these junctions via rectifiers G19 and G18, respectively. Junctions *e* and *f* are further respectively connected through impedances R71 and R72 to positive and negative potential sources, so that the junction *e* takes the most negative potential applied to it, and junction *f* takes the most positive potential applied to it. Also connected to the junctions *e* and *f* are input rectifiers G20 and G15 connected to the taps *c* and *d* along potentiometers R47/R48 and R45/R46 connected between negative potential and ground and positive potential and ground, respectively, so that the taps *c* and *d* in their rest condition are negative and positive with respect to ground, which for example herein according to the above mentioned voltages is minus 10 volts and plus 10 volts with respect to ground. These taps *c* and *d* are also connected via condensers C4 and C3 to the output terminals 3‴ and 10‴ of the generator circuit G, respectively, but since in rest condition the charges on the condensers C1 and C2 of the generator circuit are equal and constant, this condition has no effect upon the taps *c* and *d*. However, in view of the normal charges on the taps *c* and *d* from their potentiometers and the conductance of the rectifiers G20 and G15, the junctions *e* and *f* are correspondingly negative and positive in potential with respect to ground, irrespective of the potential applied to point *i* or terminal *g*, as long as the points *c* and *d* remain at their normal negative and positive potentials. Because the output rectifiers G17 and G16, connected respectively to the junctions *e* and *f*, are non-conductive to their present rest condition potentials, the output terminal *h* of the scanning device S1 may assume any potential between the voltages on these junctions *e* and *f*.

In order to insure that the rest condition of the output memory circuit U will always be in its positive state corresponding to a positive or stop element potential at its output terminal OUT, a locking circuit is provided comprising an electron relay cell means having a junction *j* directly connected through low impedance R73 to a positive potential source. This junction *j* is connected to three input rectifiers G5, G6 and G7 and an output rectifier G8 which is connected through conductor 32 to the input terminal 7′ of the output memory circuit U. As stated above when the system is in rest condition, the trigger type circuits IS and DS are both in their positive states so that positive potentials from their output terminals 4′ are directly conducted through conductors 30 and 23 to the input rectifiers G6 and G5, respectively, and also from conductor 30 through a resistance R50 of a delay circuit including condenser C8 to the input rectifier G7, so that at most after the expiration of the delay of said delay circuit, all of the input rectifiers G5, G6 and G7 will have positive potentials applied to them, which permits the positive potential from the source through low impedance R73 to be applied through rectifier G8 and conductor 32 to the input terminal of the output memory circuit U, when both the input circuit IS and the auxiliary start-stop circuit DS are in their rest condition. This also indicates that no signals are being applied to the input terminal IN for repetition and that the generator G is not operating.

2. *Starting circuits*

If a start element signal of negative polarity is received at the input terminal IN of the system in Fig. 7 for regenerative repetition or is applied across the terminals of the input polarized relay O shown in Fig. 7′, the conditions of these circuits are changed. The input shaper circuit IS is changed to its negative state to apply a negative potential to its output terminal 4' and $l$ and to apply a positive potential to its output terminals 9' and $k$. If the circuit of Fig. 7' were employed instead of the input circuit IS, the input or receiving relay O would move its contacts $o$ away from the full line position or its rest condition shown in Fig. 7' so that negative potential would be applied to its output terminal $q$ and postive potential would be applied to its output terminal $p$. Thus, since either terminals $k$ and $l$ or $p$ and $q$ may be directly connected to the terminals $m$ and $n$, either a polarized relay circuit as shown in Fig. 7', or a trigger type shaper circuit IS, may be employed for applying the input signal element potentials or polarities to the system of this invention.

If the above applied negative potential to the input terminal IN or to relay O persists for more than 10 milliseconds, the minimum duration for response of the system of this invention due to the time constant circuits of the condensers C1 and C2 in the multivibrator generator circuit G described above in section II–3, then the following operations and changes in the circuits of Fig. 7 take place:

The resulting positive potential then applied to the terminal $m$ is applied to the rectifier G1 of the first electron relay cell means having the junction $a$ so that this junction now takes a positive potential because no negative potential is applied to it, in that the only other input rectifier G2 to this relay cell junction $a$ is connected to the point $r$ which is connected via the resistance R41 and the conductor 23 to the now and at rest condition positive output potential from the auxiliary start-stop circuit DS. Therefore, since the next electron relay cell having junction $b$ assumes the most positive potential applied to it, it becomes positive from the positive potential now at junction $a$ through rectifier G3 and correspondingly causes the input terminal 7'' of the start-stop circuit SSS to change to its positive state and start the operation of the multivibrator generator circuit G as described in section II–3 above.

The starting of the generator G after the 10 milliseconds have elapsed due to the time constant circuits of the condensers C1 and C2, applies simultaneously a first positive potential impulse to the generator output terminal 3''' and a first negative potential impulse to the generator output terminal 10'''. These potential impulses are directly applied to the taps $c$ and $d$ via condensers C4 and C3, to change the normal or rest condition of negative and positive potentials of the taps $c$ and $d$ to positive and negative, respectively. The positive potential now at tap $c$ does not affect the normal or rest condition potential at the junction $e$ because a negative potential still exists at the point $i$ and terminal $g$, since the junction $e$ takes the most negative potential applied to it. The negative potential, however, now at tap $d$ changes the potential at the junction $f$ from its rest condition of positive to negative, so that the output terminal $h$ of the scanning device S1 now has only negative potentials applied to it from both junctions $e$ and $f$. Output terminal $h$ then takes a negative potential which is conducted via conductors 21 and 22 directly to the input terminal 7' of the impulse amplifier circuit IV to change this circuit IV from its positive rest condition to its negative state and to produce a large and amplified negative impulse from its output terminal 3'. This amplified negative impulse from terminal 3' passes through resistance R44 and condensers C6 a[illegible] C5 of a delay circuit to the input terminal 8' of the auxiliary start-stop circuit DS to change the positive rest condition of this circuit DS into its negative state which then applies negative potential to each of its output terminals 4' and 5', and positive potential to its output terminal 9'. The large or amplified negative impulse applied to the condenser C5 only leaks off slowly from the point $b'$ due to the resistances R42 and R43 of the delay circuit, one of which may be variable so that the delay is adjusted to approximate the duration of one whole signal or about 120 milliseconds, (see graph DS8 in Fig. 8). Then the point $b'$ will remain negative for this time and thereby maintain this auxiliary start-stop circuit DS in its negative state until it is triggered into its positive state by the sixth positive impulse from the output terminal $h$ of the scanning device S1, by way of the circuit IV communicated to the junction $b'$. This positive sixth impulse occurs at the time of the reception of the signal (see Fig. 8, graph DS8).

With the auxiliary start-stop circuit DS now in its negative state for the duration of the regeneration of the start and intelligence elements 1–5 of the signal, its positive potential output from its terminal 9' through conductor 20 and rectifier G4 maintains a positive potential at the junction $b$ regardless of the incoming potentials of the signal to be regenerated that may be applied to the other rectifier G3 connected to this junction $b$, so that the start-stop circuit SSS will remain in its positive state and keep the generator G operating for the duration of said intelligence elements of said signal. From the output terminal 4' of this auxiliary circuit DS (see wave form DS4 in Fig. 8), a negative potential is applied through conductor 23 both to charge the condenser C7 of the stop element duration delay circuit including resistance R41 described later in section III–4, and apply a negative potential to the rectifier G5 of the locking circuit to prevent its operation during the regeneration of said signal.

The positive and negative impulses from the generator G applied through the taps $c$ and $d$ to the scanning device S1 described above, also are simultaneously applied to the other scanning device S2 which is connected via rectifiers G14 and G9, respectively. These two rectifiers are input rectifiers of each of another pair of electron relay cell means having junctions $v$ and $w$ with common input and output terminals $s$ and $t$. The junction $v$ takes the most negative potential applied to it and the junction $w$ takes the most positive potential applied to it so that this scanning device S2 operates upon the same principles as that of the scanning device S1 described above. Since at this instant, a negative potential of the start element of the signal now being regenerated is applied to the input terminal $s$ of this scanning device S2 from the terminal $n$ through conductors 30 and 31, the positive and negative scanning impulses are applied to the input rectifiers G14 and G9, respectively, from the impulse generator G, the junctions $v$ and $w$ are now both made negative (as junctions $e$ and $f$ of scanning device S1) so that the output terminal $t$ of this scanning device S2 is also negative. This negative potential from terminal $t$ is conducted through conductor 32 to the input of the output and memory circuit U to change it from its postive rest condition into its negative state and thereby effect the starting of a regenerated negative start element of the signal from its output terminal 4' directly connected to output terminal OUT of the system. If desired this output terminal OUT may be connected as shown by a dotted line conductor 25 to an output or sending polarized relay Z which controls the operation of its contacts $z$ to apply alternative positive and negative potentials to an output line conductor from batteries V1 and V2, respectively (see right side of Fig. 7).

The above description of this section III–2 corresponds to the first long vertical dotted line at the left across the graphs shown in Fig. 8 in which the relative voltages of different terminals and points in the system of Fig. 7 are shown with respect to the time corresponding to the regeneration and repetition of the elements of the signal shown in Fig. 1.

3. *Scanning and storing circuits*

30 milliseconds ofter the start of the first good start element received at the input terminal IN and 20 milliseconds after the start of the regenerated start element (see graphs IS7, G10 and U4 in Fig. 8), the second pair of similar positive and negative impulses are produced by the generator G, to synchronize and scan the second element of the signal to be regenerated and repeated. The intermediate negative and positive impulses from the generator G which apply negative potential to the tap *c* and positive potential to the tap *d* and occur 10 milliseconds after each positive and negative pair of impulses do not change the normal or rest condition potentials for these taps and accordingly have no effect upon the operation of the system.

The first intelligence element 1 is now ready to be regenerated and repeated, so that by this second pair of positive and negative impulses the input potentials now applied to the input terminals *g* and *s* of both of the scanning devices S1 and S2, respectively, are simultaneously scanned to produce the following effects:

The input terminal *g* of the scanning device S1 has now become positive due to the change in state of the auxiliary circuit DS which now and for the duration of the intelligence elements 1—5 of the signal applies a positive potential from its output terminal 9′ through the delay circuit of resistance R49 and condenser C9 to the point *i* and terminal *g* so that they reamain positive for the duration of the intelligence elements 1—5 plus the delay of said delay circuit. This positive potential at the input terminal *g* of the scanning device S1 causes both the junctions *e* and *f* thereof to become positive each time it is scanned for the duration of the scanning pair of positive and negative impulses and correspondingly to conduct a series of positive impulses to the amplifier circuit IV each 20 milliseconds for 120 milliseconds. Each of these positive impulses must counteract the negative potential now continuously applied to said amplifier circuit IV from the now negative output terminal 5′ of the auxiliary circuit DS to produce the smaller successive positive impulses from its output terminal 3′ corresponding to the positive pulses of the wave IV3 in Fig. 8. These positive impulses are conducted through the condensers C6 and C5 to produce similar small positive pulses along the slowly discharging voltage on the condenser C5 at the point *b*′ shown by the wave DS8 in Fig 8.

In the meantime the potentials received corresponding to the intelligence elements 1—5 are successively applied to the input terminal *s* of the other scanning device S2 to correspondingly change the potentials at the junctions *v* and *w* and output terminal *t* each time a changed input potential is scanned by the positive and negative pair of impulses from the generator G. This regenerates the output signal elements potentials at the terminal *t* which are conducted successively through conductor 32 to the input terminal 7′ of the memory and output circuit U, to correspondingly change its state. One state of the circuit U is retained due to the connection through conductor 15 until it is changed by a different potential applied to its terminal 7′ via the conductor 32. The memory output circuit U thereby stores the regenerated signal element potentials for retransmission or repetition from its output terminal OUT, until actually changed by a different potential or polarity signal element applied to it at a subsequent scanning instant. Thus, each element of the signal shown in the wave form IS7 of Fig. 8 is successively scanned at the approximate centers of each element received and regenerated to repeat the intelligence elements 1—5 of the signal at the output terminal OUT according to wave form U4 delayed approximately 10 milliseconds with respect to the input wave IS7.

4. *Stopping circuit*

120 milliseconds after the start of the regenerated start element of the signal being repeated, the initial large negative charge on the condenser C5 has decreased to such a degree that the pair of positive and negative impulses from the generator G at this scanning instant are sufficient to change the state of the auxiliary start-stop circuit DS back into its positive or rest condition. This is accomplished when the still or delayed positive potential from point *i* scanned in the scanning circuit S1 is amplified in the circuit IV and applied to the condenser C5 to completely remove the negative charge on it by placing a positive charge on it, which positive charge then changes the potential of the point *b*′ from negative to positive as well as the input terminal 8′ to change the state of the auxiliary circuit DS. This change in the state of the auxiliary circuit DS is delayed from immediately affecting the potentials of the points *i* and *r* by the delay circuits R49/C9 and R41/C7, respectively, however, it does immediately apply a negative potential from its output terminal 9′ through conductor 20 to rectifier G4 of the relay cell means having junction *b*, to change the state of the start-stop circuit SSS to shut off the generator G. The removal of all positive potentials from the junction *b* connected to the input 7″ of the start-stop circuit SSS, is insured by the negative potential which is retained on the variable condenser C7 connected to the point *r* which negative potential now is applied to cause junction *a* to remain negative as long as the negative charge remains on the condenser C7, and thereby apply negative potential for this same period of time to the only other input rectifier G3 to the junction *b*. Since the junction *a* responds to the most negative potential applied to it, it will remain negative as long as condenser C7 has not discharged its negative potential regardless of the potential applied to the input terminal *m* and rectifier G1. Therefore, by adjusting the capacity of condenser C7, the duration of the last and stop element of the regenerated signal may be varied and correspondingly, the duration of the entire signal, because no new start element can be received and responded to until the negative potential from the condenser C7 applied to the junction *a* has died away. Thus, by adjusting the condenser C7 to effect a duration of not more than about 135 milliseconds for an entire signal, compensation can automatically be made for signals which may be received at too fast a rate, or the condenser C7 may be adjusted to produce a signal of 140 milliseconds duration and insure repetition of a stop element of at least 20 milliseconds duration.

The stop element received at the input terminal IN or *m* will, when scanned by the same positive and negative pair of impulses from the generator G that stopped the generator G as just described, change the state of the output memory circuit U through the scanning device S2 to be in its stop element or positive state. However, in the event the last element received for regeneration and repetition happens to be a negative polarity element and since in the rest condition of the system a positive potential is applied to the input terminal IN, this positive potential, after a delay caused by the delay circuit of the condenser C8 and resistance R50 in the locking circuit described before in section III–1, applies positive potentials to the input rectifiers G6 and G7, and from terminal 4 of the normal rest position of the start-stop circuit DS to the input rectifier G5, so that the electron relay cell means having junction *j* is put at a positive potential, which positive potential is conducted through rectifier G8 and conductor 32 to the input of the output memory circuit U to insure its being put into its positive state corresponding to its rest condition.

Accordingly one complete signal of seven elements is regenerated and repeated and the system remains shut off until the start of a start element of a succeeding signal puts it into operation again to repeat the cycle just described.

While there is described above the principles of this invention in connection with specific apparatus, it is to be clearly understood that this description is made only by way of example and not as a limitation to the scope of this invention.

While I have illustrated and described what I regard to be the preferred embodiment of my invention, nevertheless it will be understood that such is merely exemplary and that numerous modifications and rearrangements may be made therein without departing from the essence of the invention, I claim:

1. In a regenerative repeater system for multi-element start-stop code signals, said system comprising: signal input and output circuits, a pulse generator, a start-stop circuit connected to said input circuit for controlling said generator, and a first scanning device connected between said input and output circuits and controlled by the pulses from said generator for controlling said output circuit successively in accordance with the elements of the signals received at said input circuit, the improvement comprising: a pulse amplifier circuit, a second scanning device connected to said pulse amplifier circuit and controlled by the pulses from said generator for controlling said amplifier circuit and means connected to said pulse amplifier circuit for controlling said stop-start circuit to stop said generator a predetermined time after its start.

2. A system according to claim 1 wherein said input circuit comprises an electronic amplifier shaper circuit.

3. A system according to claim 1 wherein said input circuit comprises a polar relay.

4. A system according to claim 1 wherein said output circuit comprises a bi-stable electronic trigger circuit.

5. A system according to claim 1 wherein said output circuit includes a polar relay.

6. A system according to claim 1 wherein said pulse generator is a multivibrator having a frequency of oscillation substantially equal to the repetition rate of the elements in a signal.

7. A system according to claim 6 including means for adjusting the frequency of said multivibrator.

8. A system according to claim 1 wherein said generator produces both scanning and synchronizing pulses.

9. A system according to claim 1 including means for synchronizing the production of pulses by said generator to scan the center portion of the elements of a signal.

10. A system according to claim 1 wherein said start-stop circuit comprises a bi-stable circuit having a pair of electron tubes.

11. A system according to claim 1 wherein said first scanning device is directly connected between said input and said output circuits.

12. A system according to claim 1 wherein said scanning devices each comprise a pair of electron relay cells.

13. A system according to claim 12 wherein each said cell comprises a plurality of rectifiers connected in multiple in the same conductive direction to a common junction, and means for controlling the potential at said junction.

14. A system according to claim 1 including an auxiliary start-stop circuit connected between said means for controlling said start-stop circuit and said second scanning device.

15. A system according to claim 14 wherein said auxiliary circuit comprises a pair of cross connected electron tubes.

16. A system according to claim 14 wherein the first pulse generated by said generator at the start of each signal operates said second scanning device to change said output of said auxiliary circuit.

17. A system according to claim 1 wherein said amplifier circuit comprises a trigger circuit.

18. A system according to claim 1 wherein said means for controlling said start-stop circuit comprises a condenser which is charged by the first amplified pulse of one polarity from said second scanning device and is then discharged at a predetermined later time by another given subsequent one of a series of opposite polarity pulses from said second scanning device.

19. A system according to claim 1 wherein said means for controlling said start-stop circuit includes an electron relay cell means comprising a pair of rectifiers conductive in multiple in the same direction with respect to a junction between them.

20. A system according to claim 1 including means for insuring said output circuit from assuming an erroneous condition.

21. A system according to claim 20 wherein said insuring means includes an electron relay cell means comprising at least two rectifiers conductive in multiple in the same direction with respect to a junction between them, and means for controlling the potential at said junction.

22. A system according to claim 1 including electron relay cell means between said input and said start-stop circuits, said cell means comprising at least two rectifiers conductive in multiple in the same direction with respect to a junction between them, and means for controlling the potential at said junction.

23. In a start-stop regenerative repeater system for signals of a given number of successive substantially equal time-spaced elements, each signal including a synchronizing element and a plurality of intelligence elements, said system comprising: signal input and output circuits, a multivibrator generator for producing pulses, a start-stop circuit connected to said input circuit for controlling said generator, a first scanning device connected between said input and output circuit and controlled by the pulses from said generator for successively scanning substantially the centers of the elements of each signal received at said input circuit and for successively conditioning said output circuit in accordance with each element so scanned, the improvement comprising: an amplifier circuit, an auxiliary start-stop circuit connected between said start-stop circuit and said amplifier circuit, a second scanning device connected to said amplifier circuit and controlled by the pulses from said generator for scanning the condition of said auxiliary circuit and controlling said amplifier in accordance with said scanned condition, and means connected to said amplifier for changing the condition of said auxiliary circuit for controlling said start-stop circuit to stop said generator a predetermined time after said generator is started.

24. A system according to claim 23 wherein said synchronizing element of each signal always has the same polarity and is the first and start pulse of each signal.

25. A system according to claim 24 including means for preventing said system from responding to said start elements which are less than a given duration.

26. A system according to claim 23 wherein said means controlled by said amplifier includes a delay circuit having a condenser, which condenser controls said auxiliary circuit during the reception of the intelligence elements of a signal.

27. A system according to claim 23 including a relay cell means for controlling said start-stop circuit by said auxiliary circuit.

28. A system according to claim 23 including means for varying the time for operating said generator during the time of communicating a signal by said system.

29. A system according to claim 23 including means to insure the stopping of said generator at the end of each signal regardless of the polarity of the last element of each signal.

30. In a regenerative repeater system for multi-element start-stop code signals, said system comprising: signal input and output circuits, a start-stop circuit connected to said input circuit, a multivibrator pulse generator connected to said start-stop circuit, and a first scanning device connected between said input and output circuits and controlled by the pulses from said generator for controlling said output circuit in accordance with the signals received at said input circuit, the improvement comprising: a second scanning device connected to said generator, a pulse amplifier connected to said second scanning device, an auxiliary start-stop circuit connected between said pulse amplifier and said second scanning device whereby said second scanning device controls said amplifier in accordance with the polarity of the output of said auxiliary circuit, a condenser connected to said pulse amplifier and being charged and discharged by different polarity and predetermined pulses from said amplifier to change the polarity of said output of said auxiliary circuit, and means controlled by a given polarity output of said auxiliary circuit for controlling said start-stop circuit to stop said generator a predetermined time after its start by said start-stop circuit.

31. In a start-stop regenerative repeater system for signals of a given number of successive substantially equal time-spaced elements, each signal including a synchronizing element and a plurality of intelligence elements, said system comprising: an input circuit, a bi-stable output circuit, a start-stop circuit connected to said input circuit, a multivibrator pulse generator connected to said start-stop circuit for producing regularly both scanning and synchronizing pulses, a first scanning device connected between said input and output circuits and comprising a pair of electron relay cells of three rectifiers each and connected to said generator to be controlled by said scanning pulses to detect successively the signal elements received at said input circuit and to store them successively in said output circuit, and a second scanning device connected to said generator and comprising another pair of electron relay cells of three rectifiers in multiple to a common junction and each controlled by said synchronizing pulses to control said stop-start circuit at a predetermined time after the start of said generator.

32. A system according to claim 1 including means to prevent the operation of said system unless the first pulse for a signal to be regenerated has at least a predetermined duration.

References Cited in the file of this patent

UNITED STATES PATENTS

| | | |
|---|---|---|
| 2,406,096 | Morrison | Aug. 20, 1946 |
| 2,430,547 | Anderson | Nov. 11, 1947 |
| 2,612,563 | Dain | Sept. 30, 1952 |
| 2,649,502 | Odell | Aug. 18, 1953 |

FOREIGN PATENTS

| | | |
|---|---|---|
| 653,867 | Great Britain | May 30, 1951 |
| 680,726 | Great Britain | Oct. 8, 1952 |
| 692,458 | Great Britain | June 3, 1953 |
| 945,227 | France | Nov. 22, 1948 |